C. HEALY.
POWER RAMP.
APPLICATION FILED AUG. 16, 1913.
1,098,725.
Patented June 2, 1914.
2 SHEETS—SHEET 1.
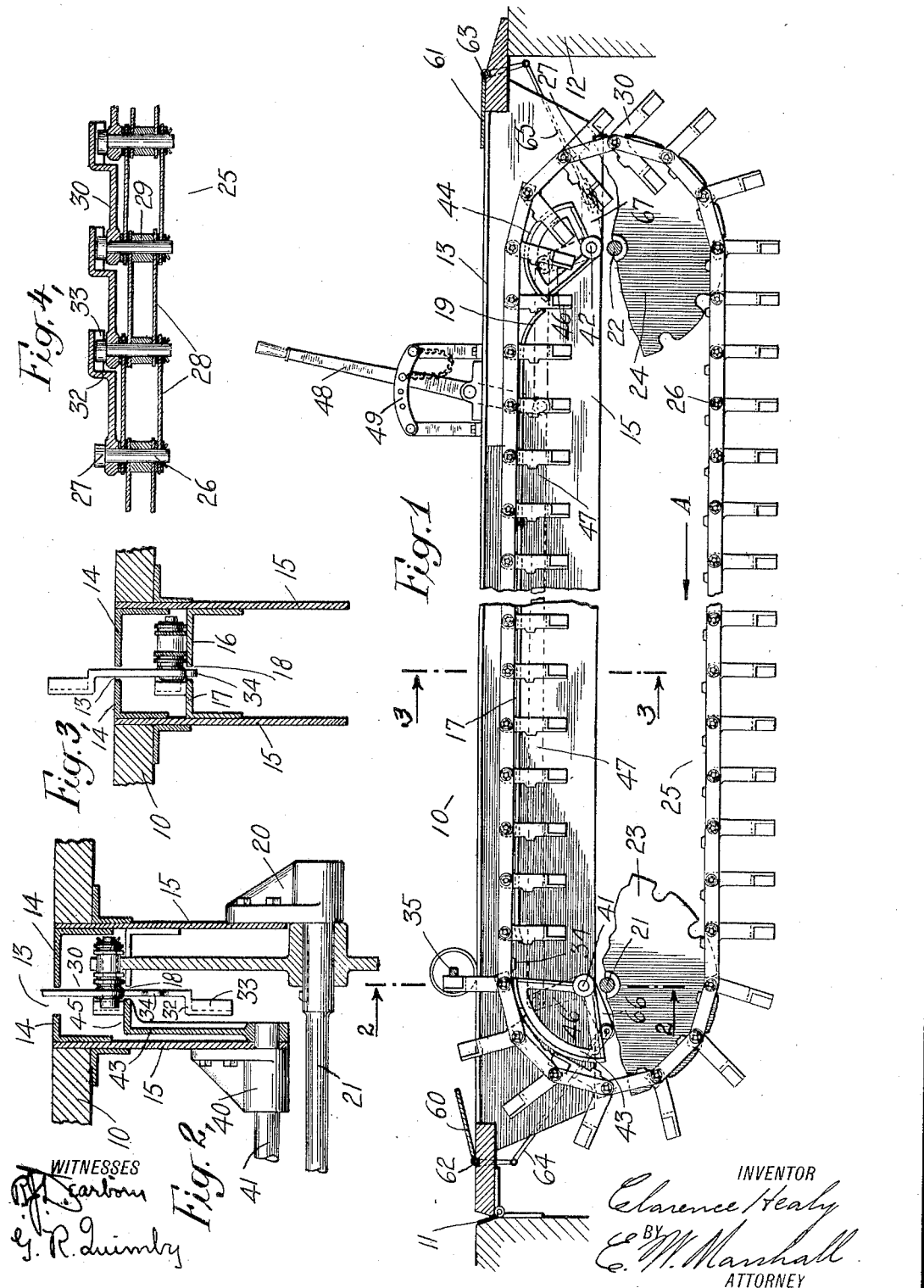
INVENTOR
Clarence Healy
BY
E. W. Marshall
ATTORNEY
WITNESSES C. HEALY.
POWER RAMP.
APPLICATION FILED AUG. 16, 1913.
1,098,725.
Patented June 2, 1914.
2 SHEETS—SHEET 2.
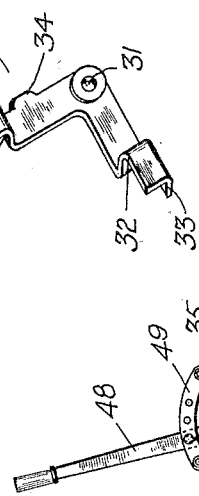
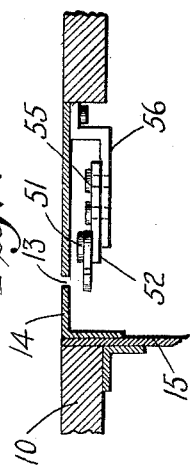
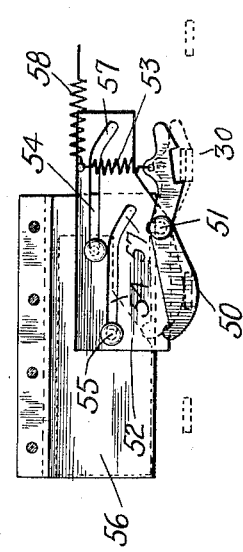
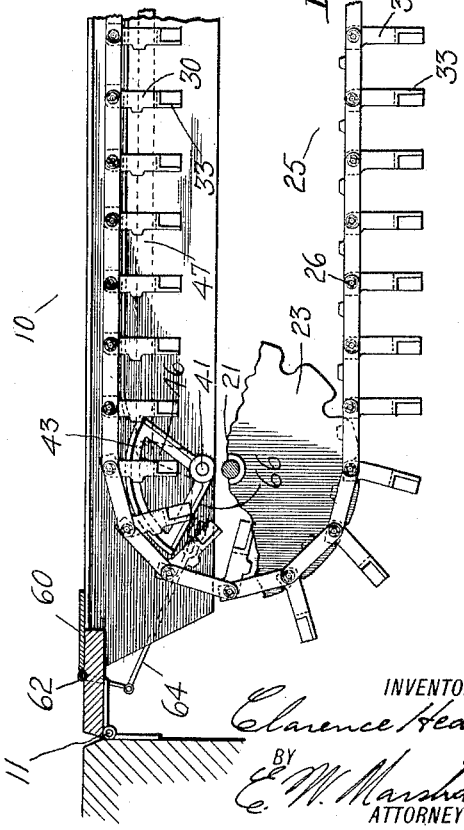

UNITED STATES PATENT OFFICE.

CLARENCE HEALY, OF EAST ORANGE, NEW JERSEY.

POWER-RAMP.

1,098,725. Specification of Letters Patent. Patented June 2, 1914.

Continuation in part of application Serial No. 695,370, filed May 6, 1912. This application filed August 16, 1913. Serial No. 785,068.

*To all whom it may concern:*

Be it known that I, CLARENCE HEALY, a citizen of the United States, and a resident of East Orange, in the county of Essex and State of New Jersey, have invented certain new and useful Improvements in Power-Ramps, of which the following is a specification, reference being had to the accompanying drawings, forming a part thereof.

This invention relates to ramps over which trucks and the like may be freely moved and its object is to provide with a ramp a motor driven mechanism which may be brought into operation at will, to assist in moving hand-trucks or other objects along the ramp, but which shall not obstruct the working surface of the ramp when not in use or when not engaged with such an object. More specifically it relates to a mechanism by means of which objects may be pushed along the ramp in one direction or the other, or their movements on the ramp retarded.

I will describe my invention in the following specification and point out the novel features thereof in appended claims.

Referring to the drawings,—Figure 1 is a longitudinal sectional elevation of a ramp embodying my invention. Fig. 2 is a transverse sectional elevation of a portion of the apparatus which is shown in Fig. 1, the section being taken on the line 2—2 of Fig. 1. Fig. 3 is a transverse section on the line 3—3 of Fig. 1. Fig. 4 is a sectional plan view of a portion of a conveyer chain and the load engaging levers carried thereon. Fig. 5 is a view similar to that shown in Fig. 1 of the same mechanism, but with the parts thereof in different operative positions. Fig. 6 is a plan view and Fig. 7 an end elevation of a lever holding mechanism which is used in connection with the other parts of the apparatus. In Fig. 6 this mechanism is shown by itself, while in Fig. 7 it is shown affixed to the ramp, the parts of which are shown in transverse section. In Fig. 8 one of the load engaging levers is shown in perspective.

Like characters of reference designate corresponding parts in all the figures.

The ramp proper is designated by 10. It is shown in the drawings as having one of its ends pivoted at 11 to a permanent support such as a dock, and its other end resting upon another support 12 which may be for example, a boat. Through the greater part of the length of the ramp is a longitudinal slot 13 preferably near the center of the ramp. This may be formed, as is shown in Figs. 2 and 3, between a pair of angle irons 14. The ramp is reinforced near the slot by a pair of webs 15. An angle iron 16 affixed to one of the webs 15 through the greater part of its length forms a support for the chain which will be described presently. Another angle iron 17 is affixed to the other web opposite the angle iron 16. Between these angle irons is a narrow slot 18 below the slot 13 and below the upper surface of the ramp. Affixed to one of these webs near the ends of the ramp, are bearings such as 20 for shafts 21 and 22, at least one of which is motor driven. Affixed to shaft 21 is a sprocket wheel 23 and affixed to shaft 22 is a similar sprocket wheel 24. Over these runs an endless chain 25 which comprises a plurality of transverse pins 26 provided with heads 27 connected by links 28 and surrounded by rollers 29.

On each pin, at one side of the chain thus formed, is pivotally supported one of the load engaging levers 30. Each of these is in the form of a bell-crank lever having two arms at an angle to each other and provided with a hole 31 near the intersection of the arms, by means of which holes these levers are supported near the headed ends of the pins 26. Both of the arms of these levers are off-set as at 32 and are constructed with webs 33. The arms of these bell crank levers are of approximately the same length as that of the links 28 so that the webs 33 of any one of the levers are adapted to engage the heads 27 of the pins adjacent the one upon which the lever is supported. One of the arms of each lever is also constructed with a lug 34 projecting from one of its edges.

On one of the webs 15 near the ends of the ramp, are bearings such as 40 for cam shafts 41, 42 which are directly above the sprocket wheel shafts 21, 22 respectively. Affixed to shaft 41 is a segmental cam 43 and affixed to the other cam shaft 42 is a similar cam 44. Each of these cams is constructed with a rim flange such as that shown at 45 in Fig. 2.

Affixed to the cam shafts are arms 46 which are connected together by a bar 47. A hand lever 48 is connected with this bar, by means of which the bar may be moved longitudinally and the positions of the cams shifted. The hand lever and the cams are shown in one of their operative positions in Fig. 1 and in another position in Fig. 5. They are also capable of being moved to and held in an intermediate position. The hand lever is shown above the upper surface of the ramp where it is readily accessible and is adjacent a stationary frame 49 in which are holes through which a pin may be thrust into a hole in the lever to hold it and its connected parts in any one of the three positions to which reference has been made.

Before particularly describing the lever holding mechanism which is shown in Figs. 6 and 7, I will describe the operation of the device. When the cams are in the positions in which they are shown in Fig. 1 and the chain 25 is being driven in the direction indicated by the arrow A, it may be seen that the load engaging levers on the lower portion of the chain will assume the positions in which they are shown. As they pass around the periphery of the sprocket wheel 23, they will reach a position in which they will swing on the pins 26, but they will be prevented by the cam 43 engaging the offset portions of one of their arms from swinging all the way over, so that the other of the arms of each lever will protrude through the slot 13 above the surface of the ramp. As soon as the other arm of such protruding lever runs off from the cam, the lever can swing over into the position in which the levers on the upper portion of the chain are shown, thus leaving the surface of the ramp clear. If, however, a truck is brought upon the ramp into such a position that its axle 35 will be engaged by a protruding arm of one of the load engaging levers, that particular arm cannot drop, nor can it be forced over backward because the web 33 on the other arm of this bell-crank lever will engage the head 27 of the chain-pin 26 directly ahead of the one on which this lever is pivoted. Consequently the continued movement of the chain will cause the truck to be boosted or driven over the ramp until it reaches the other end thereof, when the arm of the load engaging lever will be drawn down below the surface of the ramp as the chain runs over sprocket wheel 24. The lug 34 will, during this operation, depend into the slot 18 formed between angle irons 16 and 17 and the load engaging lever will be steadied thereby. Although the ramp is shown in a horizontal position, it is generally inclined so that the operation described is used in lifting the load up hill.

If the hand lever 48 is moved to its central or intermediate position, the cams 43 and 44 will both be moved into such positions that the load engaging levers will clear them, so that they may swing all the way over before the ends of the arms reach the level of the surface of the ramp. This applies to either direction of chain movement so that the entire surface of the ramp may be left clear by centering the hand lever 48 even if the chain is being driven in either direction.

When the hand lever and the cams are in the positions in which they are shown in Fig. 5 and the chain 25 is being driven in the direction indicated by the arrow B, the operation is somewhat different. The cam 44 successively raises one arm of each of the load engaging levers above the platform of the ramp. As in the formerly described operation, if there is no object on the ramp with which these arms may engage, they drop again below the platform of the ramp. If a hand truck is pushed onto the ramp behind one of these projecting arms so that it cannot drop, such an arm will ride against a cam surface 50 of a latch member which is pivoted at 51 on a slidable plate 52 and will force the other end of the latch against the action of a tension spring 53 into such a position as to catch the next lever arm and to hold the latter in its raised position so that as it advances it will engage and push against the truck axle 35.

The advance of the engaged lever arm will carry the latch member and the slidable plate with it, which movement is provided for by slots 54, 54 in the plate 52, through which pass pins 55 which are affixed to a supporting bracket 56. The slots 54 are parallel with the slot 13, but they are oblique thereto at one end as at 57 so that the movement of the plate 52 is parallel with the movement of the chain 25 for a given distance after which it moves away from the chain and away from the arm of the load engaging lever which the latch has been holding, until it releases the latter. Then the plate 52 is moved back to its initial position by a tension spring 58.

Before the arm of the load engaging lever has been released from the holding mechanism, its other arm has reached the end of the angle iron 17 which is bent down as at 19 to receive it, and as it must run along this angle iron to the end thereof, its raised arm will be maintained in its raised position and will continue to drive the truck. It is to be noted that an arm of a load engaging lever directly ahead of the one which has been described as driving the truck is also raised, and this may be utilized to retard the forward movement of the truck so that the truck will move no faster than the chain. This is often desirable in moving heavy loads down grade.

As the arms of the load engaging levers 30 are successively pushed up through slot 13 above the platform of the ramp near one or the other end thereof, it is desirable to provide guard plates 60, 61 which are pivoted at 62, 63, respectively and are connected by rods 64, 65 which are connected by slot and pin structures with short arms 66, 67 on cam shafts 41, 42. By this arrangement the guard plate at the end of the ramp through which the arms are being raised, will be raised slightly, enough to warn the workmen to keep off the slot, but not enough to interfere with the passage of the trucks.

With this apparatus, the platform of the ramp is left clear so that light trucks may be moved over it by hand in the usual manner. The load engaging levers do not protrude above the platform except those which are in engagement with a truck or the like, and as these are under the trucks they are not in the workmen's way.

This application is a continuation in part of application Serial No. 695,370 which was filed by me May 6th, 1912 and allowed February 19th, 1913.

What I claim is:

1. A ramp having a platform, an endless chain, a plurality of load engaging levers thereon, means for successively raising said levers into engaging position above the platform, said levers being arranged to be maintained in their raised positions by engagement therewith of an object on the platform.

2. A ramp having a platform provided with a longitudinal slot, an endless chain, a plurality of load engaging levers thereon beneath said platform, and means for successively raising said levers through said slot through a short portion of their path of travel, said levers being arranged to be maintained in their raised positions by engagement therewith of an object on the platform.

3. A ramp having a platform provided with a longitudinal slot, an endless chain, a plurality of load engaging levers thereon beneath said platform, a cam for successively raising said levers through said slot into engaging position, said members being arranged to be maintained in their raised position by engagement therewith of an object on the platform and a guide for maintaining the engaged levers in raised position.

4. A ramp having a platform provided with a longitudinal slot, an endless chain, a plurality of load engaging levers thereon beneath said platform, a cam for successively raising said levers through said slot into engaging position, said levers being arranged to be maintained in their raised position by engagement therewith of an object on the platform, a guide for maintaining the engaged levers in raised position and means for bridging the gap between the cam and the guide to prevent the engaged levers from dropping out of raised position.

5. A ramp having a platform, an endless chain, a plurality of load engaging levers thereon beneath said platform, a cam for raising said levers above the platform, said levers being arranged to be maintained in their raised position by engagement therewith of an object on the platform and means connected with the lever next preceding the engaged lever for maintaining the latter in raised position.

6. A ramp having a platform, an endless chain, a plurality of load engaging levers thereon beneath said platform, a cam for successively raising said levers above the platform into engaging position and means connected with the lever next preceding the engaged lever for maintaining the latter in raised position, said maintaining device operating through the medium of the engaged object and serving to limit the movement thereof.

7. A ramp having a platform, an endless chain, a plurality of load engaging levers thereon beneath said platform, and means for maintaining two of said levers above the platform in position to engage a fixed part of an object on the platform on either side thereof whereby said object is moved at only the speed of the chain.

8. A ramp having a platform, an endless chain, a plurality of load engaging levers thereon beneath said platform and means at a predetermined part of the ramp for raising said levers above the surface of the platform and maintaining said levers in a raised position during a short portion only of their path of travel.

9. A ramp having a platform, an endless chain, a plurality of load engaging bell-crank levers carried by the chain, each comprising two arms joined at substantially right angles to each other, said chain comprising a plurality of transverse pins passing through and swingingly supporting said driving members near the points of junction of their arms, each of said arms being arranged to engage the pin adjacent the one on which it is pivoted to limit its swinging movement in both directions and means at a predetermined part of the ramp for engaging one of the arms of each member to swing the other arm into a position above the platform.

10. A ramp having a platform, an endless chain arranged to be driven in either direction, a plurality of load engaging levers thereon, a cam at each end of the ramp for successively raising said levers above the platform, and means for moving either cam into operative position.

11. A ramp having a platform, an endless chain arranged to be driven in either direction, a plurality of load engaging levers thereon beneath said platform and means at predetermined parts of the ramp for raising the load engaging levers above the platform and maintaining the levers in a raised position during short portions only of their path of travel in either direction of chain movement.

12. A ramp having a platform provided with a longitudinal slot, an endless chain arranged to be driven in either direction, a plurality of load engaging levers thereon beneath said platform and means for successively raising said levers above the platform into engaging positions in either direction of movement of said chain, said members being arranged to be maintained in their raised position by engagement therewith of an object on the platform.

13. A ramp having a platform, an endless chain arranged to be driven in either direction, a plurality of load engaging levers thereon, a cam near each end of the ramp for successively raising said levers above the platform and means for simultaneously moving either cam into operative position and the other cam into inoperative position.

14. A ramp having a platform, an endless chain arranged to be driven in either direction, a plurality of load engaging levers thereon, a cam near each end of the ramp for successively raising said levers above the platform and means for simultaneously moving both of said cams into inoperative position or either cam into operative position and the other cam into inoperative position.

15. A ramp having a platform, an endless chain, a plurality of load engaging bell-crank levers carried by the chain, each comprising two arms joined at substantially right angles to each other, said chain comprising a plurality of equally spaced transverse pins passing through and swingingly supporting said levers near the points of junction of their arms, each of said arms being arranged to engage with the pin adjacent the one on which it is pivoted to limit its swinging movement in both directions, a cam on each end of the ramp for engaging one of the arms of each member to raise its other arm into a position above the platform and means for moving either cam into operative position.

16. A ramp having a platform, an endless chain, a plurality of load engaging bell-crank levers carried by the chain, each comprising two arms joined at substantially right angles to each other, a lug projecting from the edge of one of the arms of each lever, said chain comprising a plurality of equally spaced transverse pins passing through and swingingly supporting said levers near the points of jointure of their arms, each of said arms being arranged to engage with the pin adjacent the one on which it is pivoted to limit its swinging movement in both directions, a cam on each end of the ramp for engaging one of the arms of each member to raise its other arm into a position above the platform, means for moving either cam into operative position and longitudinal members at the sides of the lug on a lever which is in engaging position.

17. A ramp having a platform provided with a longitudinal slot, an endless chain arranged to be driven in either direction, a plurality of load engaging levers thereon, a cam near each end of the ramp for successively raising said levers above the platform, a guard plate at each end of the slot, a control lever and operative connections between the control lever and the cams and guard plates.

It witness whereof, I have hereunto set my hand this 15" day of August, 1913.

CLARENCE HEALY.

Witnesses:
 G. QUIMBY,
 E. W. MARSHALL.

---

Copies of this patent may be obtained for five cents each, by addressing the "Commissioner of Patents, Washington, D. C."